United States Patent [19]
Asou et al.

[11] Patent Number: 5,535,783
[45] Date of Patent: Jul. 16, 1996

[54] BALANCED TYPE DIRECT-ACTING ELECTROMAGNETIC VALVE

[75] Inventors: Yoshio Asou; Masami Kuramochi, both of Yawara-mura, Japan

[73] Assignee: SMC Corporation, Tokyo, Japan

[21] Appl. No.: 427,850

[22] Filed: Apr. 26, 1995

[30] Foreign Application Priority Data

Jun. 17, 1994 [JP] Japan .................................... 6-159258

[51] Int. Cl.⁶ ................................................ F15B 13/044
[52] U.S. Cl. ............................... 137/625.65; 137/625.27; 251/129.07
[58] Field of Search ...................... 137/625.27, 625.65; 251/129.07

[56] References Cited

U.S. PATENT DOCUMENTS 4,574,844  3/1986  Neff et al. ............................ 137/625.65
4,611,631  9/1986  Kosugi et al. ....................... 137/625.65

FOREIGN PATENT DOCUMENTS 0369090  5/1990  European Pat. Off. .
1202942  8/1970  United Kingdom .

OTHER PUBLICATIONS

Patent Abstracts of Japan, JP–61 96272, May 14, 1986.

*Primary Examiner*—Gerald A. Michalsky
*Attorney, Agent, or Firm*—Oblon Spivak McClelland Maier & Neustadt

[57] ABSTRACT

A direct-acting electromagnetic valve which is arranged to apply balanced fluid pressures to the opposite ends of a valve body 10 while ensuring smooth and stabilized movements of the valve body 10 in switching operations. For these purposes, a couple of cheers 16 and 17 which are formed in association with the opposite ends of the valve body 10 are communicated with each other by way of an axial through hole 12 within the valve body, and guide rings 15 are provided on the opposite end portions of the valve body 10 to guide its sliding movements. Gap spaces 15a are formed in these guide rings 15 to communicate the two chambers 16 and 17 with valve bore portions where exhaust ports EA and EB are opened.

2 Claims, 4 Drawing Sheets

BALANCED TYPE DIRECT-ACTING ELECTROMAGNETIC VALVE

BACKGROUND OF THE INVENTION

1. Field of the Art

This invention relates to a direct-acting electromagnetic valve which is arranged to drive a valve body directly from an electromagnetic drive, and more particularly to a balanced type direct-acting electromagnetic valve in which fluid pressures are applied to the opposite ends of a valve body in a balanced state.

2. Prior Art

In the direct-acting electromagnetic valves which are arranged to drive a valve body directly by means of an electromagnetic drive, it is desirable to balance the fluid pressures to be applied to the opposite ends of a valve body for the purpose of securing smooth movements of the valve body in operation.

In this regard, Japanese Laid-Open Patent Application 61-096272 proposes a balanced type direct-acting electromagnetic valve, having chambers at the opposite ends of a valve body intercommunicated with each other by way of an axial hole formed internally of the valve body and having one of the chambers directly communicated with an exhaust port.

According to the just-mentioned prior art electromagnetic valve, the fluid pressures prevailing in the chambers at the opposite ends of the valve body are balanced with each other through the intercommunicating axial through hole in the valve body, so that the position of the valve body can be switched relatively easily. In this case, however, the valve body is slidably supported in a valve bore only in part of its intermediate portion and disposed in a completely free state at its axially opposite end portions. This gives rise to problems such as inclinations or instable movements of the valve body which might take place while it is in movement for a switching operation. The inclinations of the valve body will result in scratchy contact of the valve body with the walls of the valve bore, causing malfunctioning in switching operations due to the instable staggering motions of the valve body or shortening the service life of the electromagnetic valve itself to a considerable degree.

SUMMARY OF THE INVENTION

It is an object of the present invention to provide a balanced type direct-acting electromagnetic valve which is arranged to apply balanced fluid pressures to the opposite ends of a valve body, while ensuring stabilized smooth switching operations of the valve body free of inclinations or abrasive scratchy contact as mentioned above.

In accordance with the present invention, the above-stated objective is achieved by the provision of a balanced type direct-acting electromagnetic valve including a main valve assembly incorporating a slidable valve body to switch the flow direction of a pressurized fluid and an electromagnetic drive having a movable iron core for directly driving the valve body, characterized in that: the main valve assembly comprises a casing internally defining a valve bore for receiving the valve body slidably therein, and having an inlet port opened into a center portion of the valve bore, a couple of output ports opened into the valve bore at positions axially on the opposite sides of the inlet port, a couple of exhaust ports opened into the valve bore at positions axially on the outer sides of the respective output ports, and a couple of chambers formed in association with the opposite ends of the valve bore; and the valve body comprises an axial through hole intercommunicating the two cheers, and a couple of guide rings fitted on circumferential surfaces of axially opposite end portions thereof and held in sliding contact with inner peripheral surfaces of the valve bore to guide movements of the valve body therealong, the guide rings being each formed with a gap space for communicating the two chambers with valve bore portions where the exhaust ports are opened, the valve body having equalized pressure receiving areas at the opposite ends thereof.

In a more specific preferred form of the invention, the movable iron core of the electromagnetic drive is positioned in one of the chambers at the opposite ends of the valve bore along with a return spring member for biasing the movable iron core toward an initial or returned position, while a valve spring is provided in the other chamber for biasing the valve body toward the movable iron core.

With the balanced type direct-acting electromagnetic valve of the above-described arrangements, the position of the valve body is switched upon energizing or de-energizing the electromagnetic drive. In this regard, since the chambers at the opposite ends of the valve bore are communicated with each other by way of the axial through hole in the valve body, the fluid pressures which act on the opposite ends of the valve body are constantly maintained in balanced state to facilitate the valve switching operations.

Besides, the axially opposite end portions of the valve body are slidably supported by the guide rings which suitably prevent tilting motions of the valve body during the switching operations, permitting to switch the valve body in an extremely smooth and stabilized state free of scratchy contact which would lead to malfunctioning and shortened service life of the electromagnetic valve.

Further, the fluid which flows from the inlet port to one exhaust port is allowed to flow into one of the chambers through the gap space in one guide ring and then into the other chamber through the axial through hole in the valve body. Simultaneously, the fluid is discharged through the other exhaust port via the gap space in the other guide ring, accelerating the fluid discharge speed.

DESCRIPTION OF PREFERRED EMBODIMENTS

Figure 1:
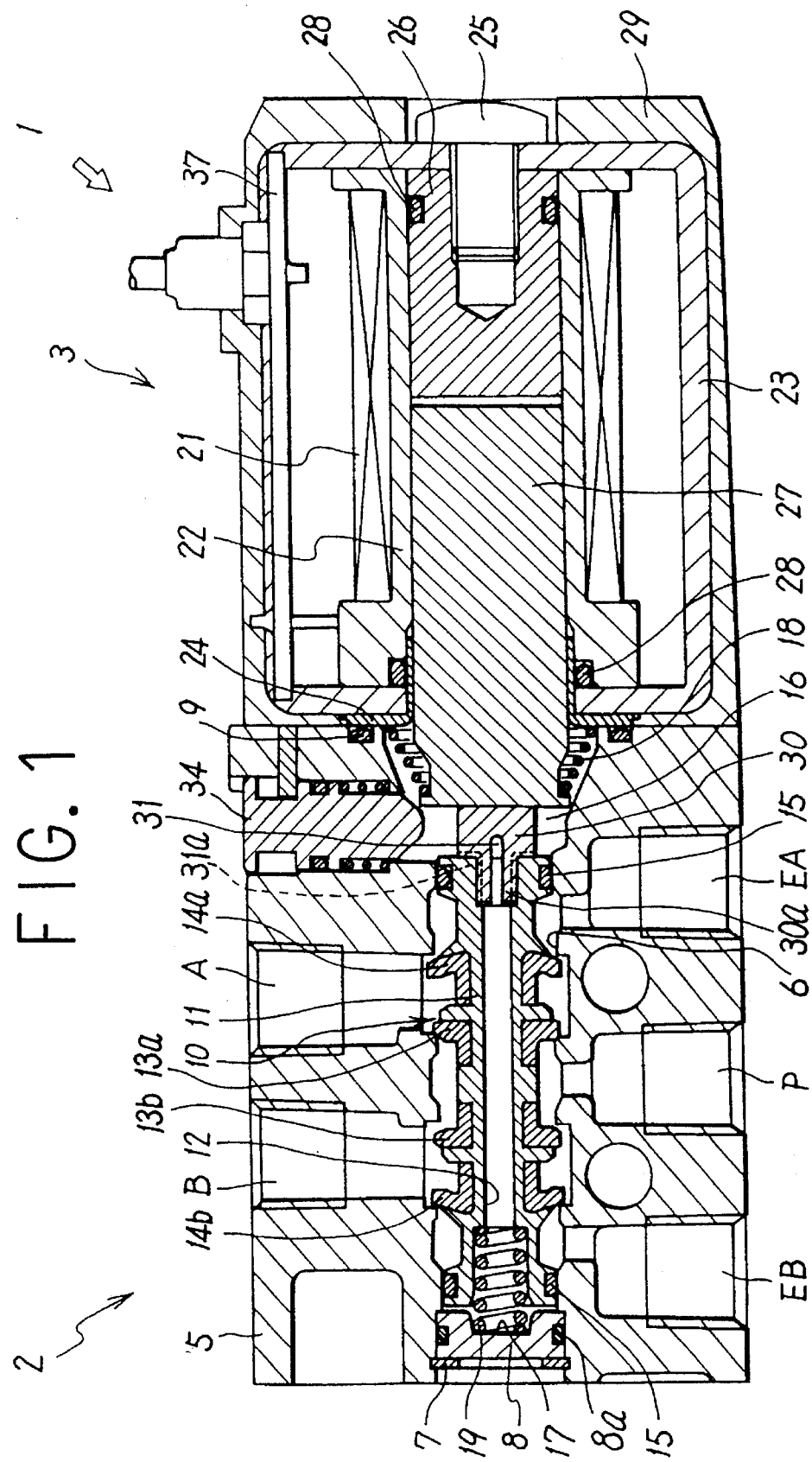
FIG. 1 is a longitudinally sectioned front view of a first embodiment of the balanced type direct-acting electromagnetic valve according to the invention, with its electromagnetic drive in de-energized state.

Referring to FIGS. 1 through 4, there is shown a first embodiment of the present invention, that is, a balanced type direct-acting electromagnetic valve 1 which is largely constituted by a main valve assembly 2 and an electromagnetic drive or solenoid assembly 3.

The main valve assembly 2 includes: a valve casing 5 which is provided with a valve bore 6 for accommodating a valve body 10; a compressed air inlet port P which is opened substantially into a center portion of the valve bore 6; a couple of output ports A and B which are opened into the valve bore 6 at positions on the opposite sides of the inlet port P; and a couple of exhaust ports EA and EB which are opened into the valve bore 6 at positions further on the outer sides of the output ports A and B. A closure member 8 is fixed in one end of the valve bore 6 by means of a stopper ring 7. A seal member 8a is fitted around the outer periphery of the closure member 8 to provide a hermetic seal therearound. The other end of the valve bore 6 is hermetically closed with a seal member 9 which is held tight against the electromagnetic drive assembly 3.

The valve body 10 which is slidably received in the valve bore 6 is provided with a valve rod 11, which is internally and centrally formed with an axial through hole 12, poppet type valve members 13a, 13b, 14a and 14b each fitted on the outer periphery of the valve rod 11, and guide rings 15 fitted on axially opposite end portions of the valve rod 11 for betterment of sliding characteristics of the valve body. When the valve body 10 is moved in the leftward and rightward directions in the drawing, the communication of the output ports A and B with the inlet port P is either alternately closed and opened or alternately opened and closed by the valve members 13a and 13b, respectively, while the communication of the output ports A and B with the exhaust ports EA and EB is either alternately opened and closed or alternately closed and opened by the valve members 14a and 14b, respectively.

The valve body 10 is arranged to have equal pressure receiving areas at its axially opposite ends so that the forces of pneumatic pressures acting on its axially opposite ends are equalized with each other.

Further, a first spring chamber 16 is defined between the valve body 10 and the electromagnetic drive assembly 3, while a second spring cheer 17 is defined between the valve body 10 and the closure member 8. A return spring 18 is mounted in a charged state within the first spring chamber 16 to urge a movable iron core 27 in a returning direction, while a valve spring 19 with a smaller biasing force than the return spring 18 is mounted in a charged state within the second spring chamber 17 to urge the valve body 10 toward the movable iron core 27.

The above-mentioned valve members 13a, 13b, 14a and 14b are formed of a resilient material such as synthetic rubber or the like. On the other hand, the guide rings 15 are in the form of open rings of a polyamide or polyacetal resin or the like each with a gap space 15a as shown particularly in FIG. 4 to provide a flow passage thereacross.

Accordingly, the first and second spring chambers 16 and 17 are communicated with each other by way of the axial through hole 12 in the valve rod 11, and at the same time communicated with the exhaust ports EA and EB through the gap spaces 15a in the guide rings 15, respectively.

The electromagnetic drive 3 includes a bobbin 22, a solenoid coil 21 wound on the bobbin 22, a magnetic frame 23 and a magnetic plate 24 enclosing the bobbin 22, a fixed iron core 26 securely fixed in one end portion of a center hole of the bobbin 22 by means of a bolt 25, and a movable iron core 27 slidably fitted in the center hole of the bobbin 22. The outer peripheral surfaces of the magnetic frame 23 is covered with a mold 29 of a synthetic resin material. The magnetic operating section 3 is hermetically attached to the valve casing 5 on the side of the first spring chamber 17 by the use of bolts or other suitable means, in such a way that the afore-mentioned return spring 18 is interposed in a charged state between the magnetic plate 24 and the movable iron core 27. Seal rings 28 are fitted between the bobbin 22 and the magnetic plate 24 and between the center hole of the bobbin 22 and the fixed iron core 26, respectively, to provide hermetic seals there.

A cushion member 30 is fixedly attached to one end of the valve rod 11 on the side of the movable iron core 27. More specifically, this cushion member 30 is fixedly attached to the valve rod 11 by way of a plural number of resiliently diverging spring strips 30a which are provided at its base portion and anchored in the through hole 12 by press-fitting. Grooves 31 are cut into the cushion member 30 between the respective spring strips 30a thereby to communicate the axial through hole 12 with the first spring chamber 16.

In order to communicate the axial through hole 12 with the first spring chamber 16, notches 31a may be provided on the surface of the cushion member 30 which is abutted against the valve rod 11, in place of or in addition to the above-described grooves 31.

Alternatively, if desired, there may be employed an arrangement of abutting the movable iron core 27 and valve rod 11 against each other directly without intervention of the above-described cushion member 30. In such a case, needless to say, a suitable flow passage which corresponds to the grooves 31 or notches 31a needs to be formed between the movable iron core 27 and valve rod 11. Besides, as a matter of course, even in a case where the movable iron core 27 is in a directly abutted position, there should be no change in the pressure receiving area on the abutting end face of the valve rod 11.

Indicated at 34 in FIG. 1 is a manual operating member which can be manipulated for the purpose of moving the movable iron core 27 by a manual operation, and at 37 is a printed wiring board which is mounted on the electromagnetic drive assembly 3 for electrically connecting the coil terminals to an external power source.

FIG. 1 shows the valve in a de-energized state with no current supply to the coil 21. In this state, the valve body 10 occupies an initial or returned position under the influence of the biasing force of the return spring 18, where the communication between the inlet port P and the output port A is blocked by the valve member 13a while the communication between the inlet port P and the output port B is opened by the valve member 13b. Further, the communication between the output port A and the exhaust port EA is opened by the valve member 14a while the communication between the output port B and the exhaust port EB is blocked by the valve member 14b.

Figure 2:
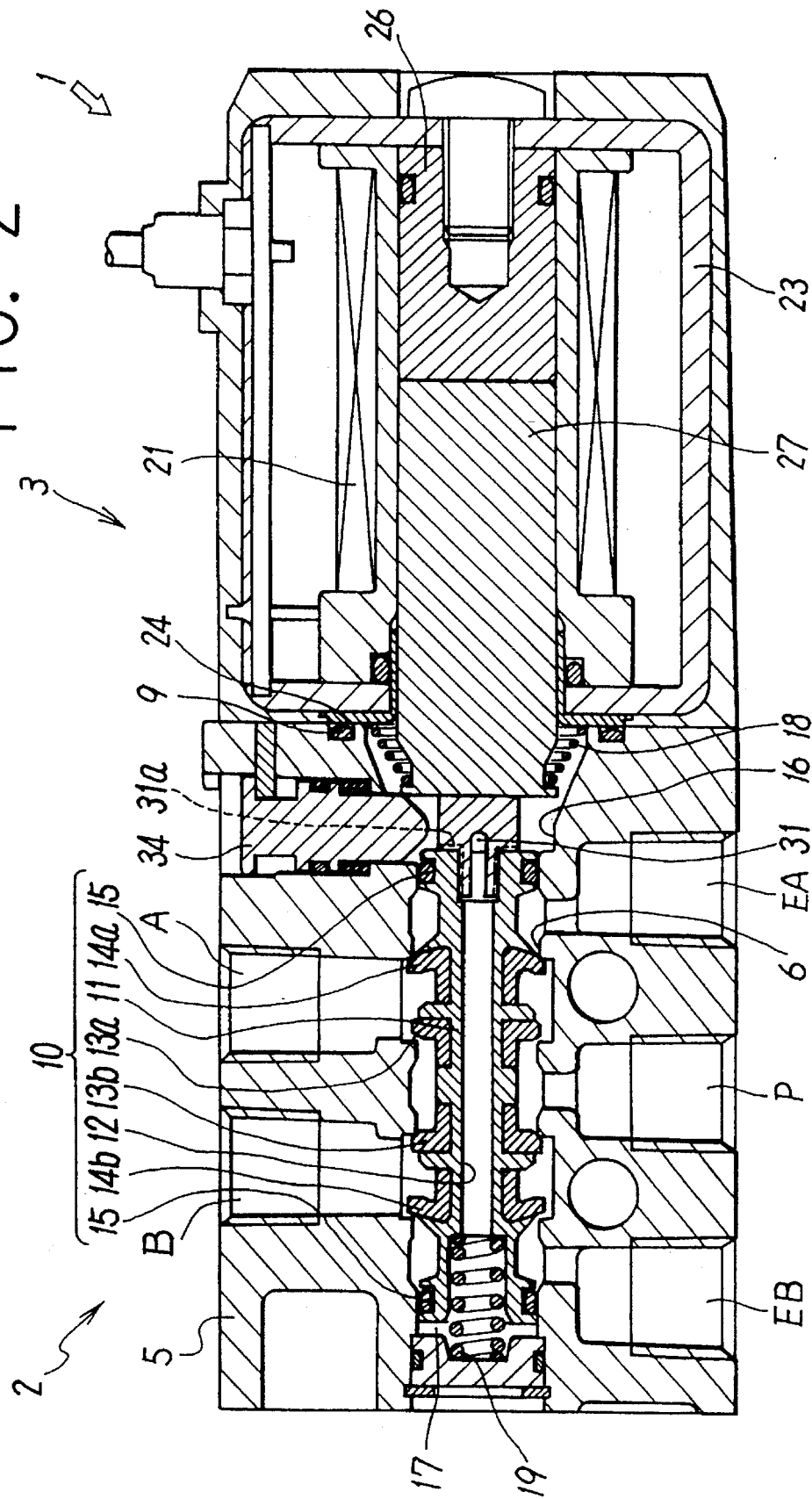
FIG. 2 is a longitudinally sectioned front view of the electromagnetic valve of FIG. 1, with the electromagnetic drive in energized state.
Figure 3:
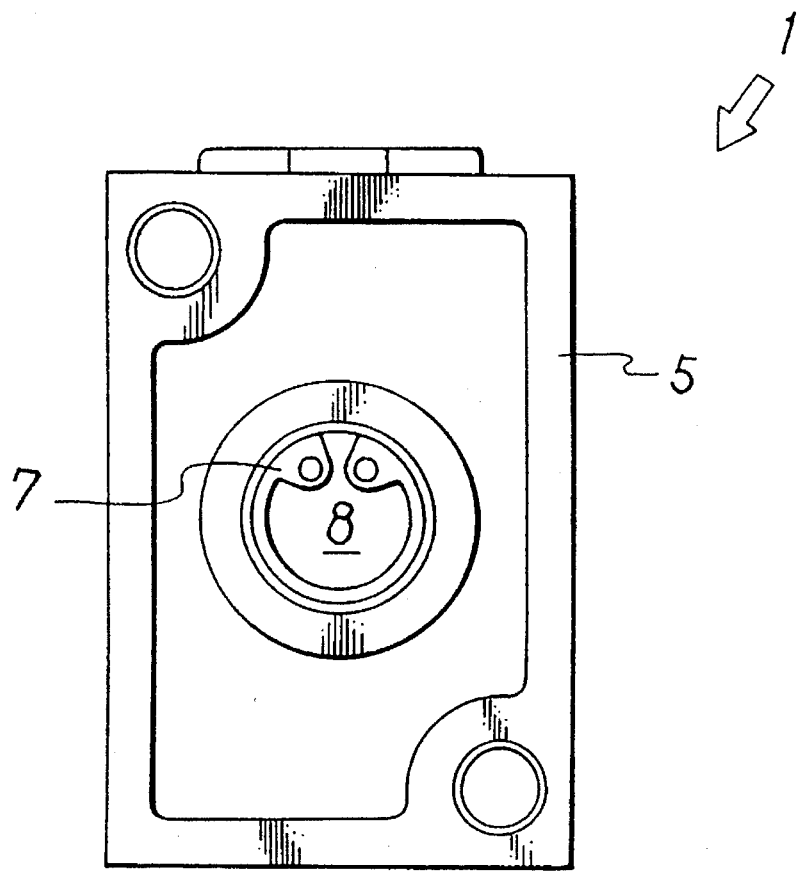
FIG. 3 is a left-hand side view of the electromagnetic valve of FIG. 1.
Figure 4:
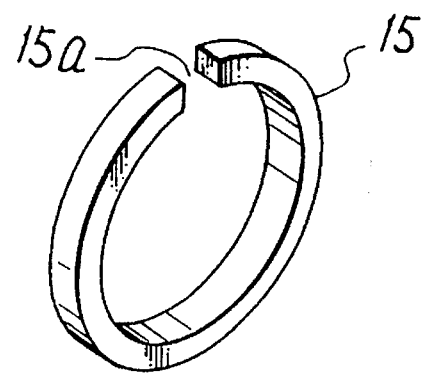
FIG. 4 is an enlarged perspective view of a guide ring.

Upon supplying current to the coil 21, the movable iron core 27 is attracted toward the fixed iron core 26 and, as shown in FIG. 2, the position of the valve body 10 is switched in the rightward direction in the drawing under the influence of the biasing force of the valve spring 19. In this position, the communication between the inlet port P and the output port A is opened by the valve member 13a, while the communication between the inlet port P and the output port B is blocked by the valve member 13b. At the same time, the communication between the output port A and the exhaust port EA is blocked by the valve member 14a, while the communication between the output port B and the exhaust port EB is opened by the valve member 14b. The valve can be put in the same position when the manual operating member 34 is pushed down as shown in the drawing without energizing the coil 21.

In this instance, the first and second spring chambers 16 and 17 are communicated with each other by way of the axial through hole in the valve rod 11 of the valve body 10, which is provided with equalized pressure receiving areas at the opposite ends thereof, so that the pneumatic pressures acting on the opposite ends of the valve body 10 are constantly maintained in balanced state to ensure extremely smooth switching operations of the valve body. In addition, the valve body 10 can be put in smooth sliding movements under the guidance of the guide rings 15 free of inclinations or instable staggering motions.

Further, part of exhaust air to be discharged from the output port B to the exhaust port EB is allowed to flow into the second spring chamber 17 through the gap space 15a in the guide ring 15 and then into the first spring chamber 16 by way of the through hole 12 and the grooves 31 or notches 31a on the cushion member 30, and to leave through the exhaust port EA which is blocked against communication with the output port A. Therefore, by securing a suitable open area in the gap space 15a, it becomes possible to accelerate the exhaust air discharge speed with the effective use of the guide rings 15 which are primarily employed to ensure smooth movements of the valve rod 11 free of inclinations or other instable staggering motions.

Upon cutting the current supply to the coil 21 or upon relieving the manual operating member 34 of the depressing force, the valve body 10 is returned to the initial position of FIG. 1 under the influence of the biasing force of the return spring 18.

At this time, the valve body 10 is moved in the same manner as described above, including the balanced actions on the valve body 10 by the pneumatic pressures prevailing in the first and second spring chambers 16 and 17 and the exhaust air discharging functions of the guide rings 15. Therefore, detailed descriptions in these respects are omitted to avoid unnecessary repetitions.

Figure 5:
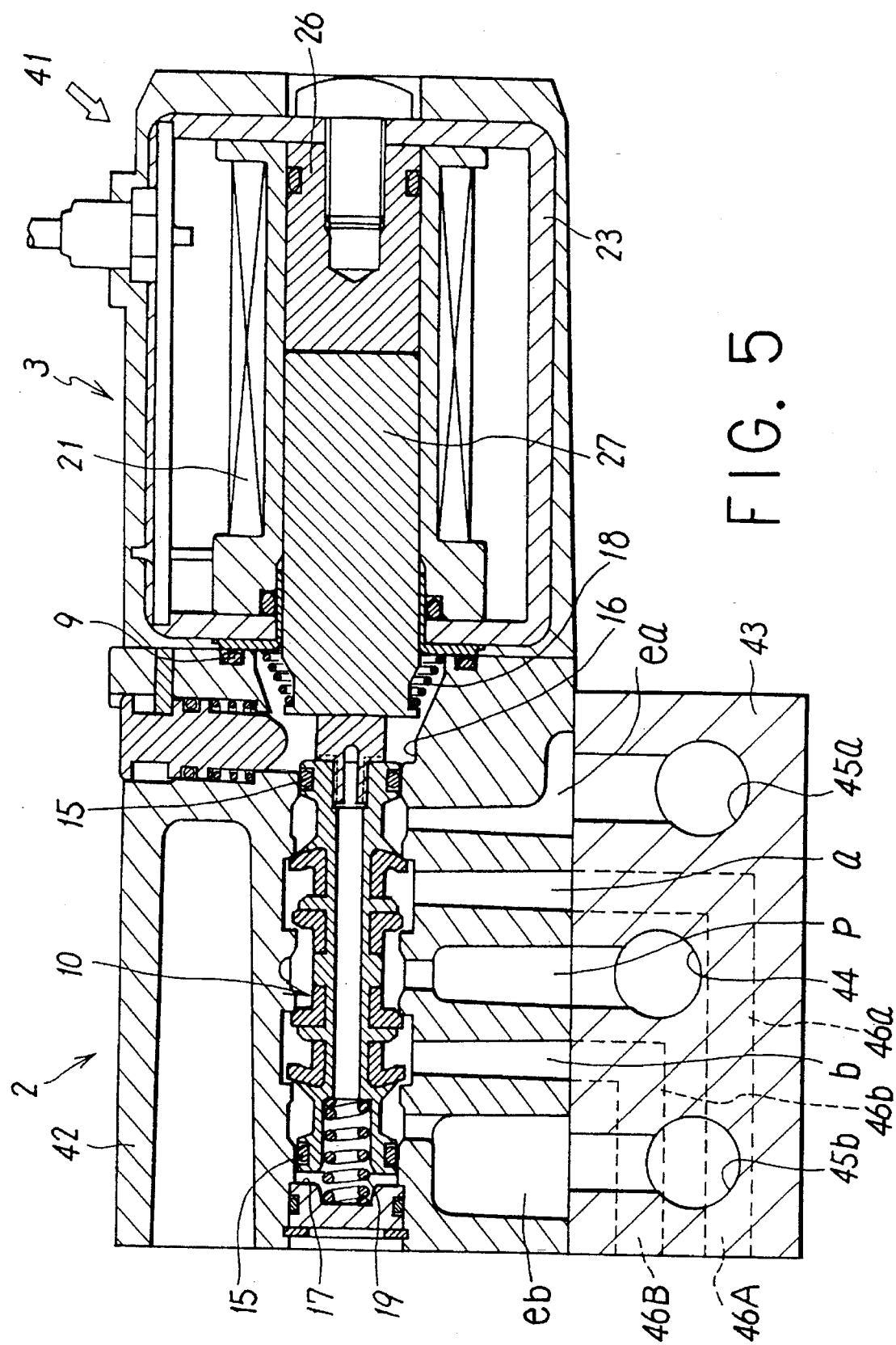
FIG. 5 is a longitudinally sectioned front view of a second embodiment of the balanced type direct-acting electromagnetic valve according to the invention, with the electromagnetic drive in energized state.

Referring now to FIG. 5, there is shown a second embodiment of the balanced type direct-acting electromagnetic valve according to the present invention, that is, a direct-acting electromagnetic valve 41 which differs from the foregoing first embodiment in that a main valve assembly 2 includes a base 43 serving as a manifold for connection of air pipes. More specifically, the electromagnetic valve 41 employs a valve casing 42 which has an inlet passage opening (p), output passage openings (a) and (b) and exhaust passage openings (ea) and (eb), which correspond to the inlet port P, output ports A and B and exhaust ports EA and EB of the first embodiment, all of the just-mentioned passages openings being opened on one side of the casing 42 to be joined with the base 43. On the other hand, opened on one side of the base 43, to be joined with the valve casing 42, are an inlet passage opening 44 in communication with an inlet port (not shown), exhaust passages openings 45a and 45b respectively in communication with exhaust ports (not shown), and output passage openings 46a and 46b in communication with output ports 46A and 46B which are provided on the front side of the base 43. In this case, arrangements are made such that the respective passage openings on the part of the valve casing 42 are communicated with corresponding passage openings on the part of the base 43 upon mounting the valve casing 42 on the latter.

In other respects, the second embodiment is substantially same as the foregoing first embodiment in construction, so that common component parts are simply designated by common reference numerals without going into detailed description to avoid repetitions.

In operation, the second embodiment functions substantially in the same manner as the first embodiment except that compressed air is fed to and discharged from the valve through the inlet passage 44 and exhaust passages 45 in the base 43 and output compressed air appears at either one of the output ports 46 on the front side of the base 43.

Needless to say, the valve body, which has been shown as having poppet type valve members in each one of the foregoing embodiments, may be replaced by a spool type valve body if desired.

Further, the two exhaust ports which are provided separately in the above-described embodiments may be intercommunicated or merged into one and single exhaust port if desired.

As clear from the foregoing description, the balanced type direct-acting electromagnetic valve construction according to the present invention permits to switch the valve body quite easily and smoothly in a stabilized state, thanks to the application of balanced pneumatic pressures to the opposite ends of the valve body and under the guidance of the guide rings which are fitted on the opposite ends of the valve body. This valve construction suitably prevents scratchy contact between the valve body and the valve bore, which would shorten the service life of the electromagnetic valve itself as mentioned hereinbefore.

In addition, the gap spaces which are provided in the guide rings permits to discharge the exhaust fluid simultaneously through the two exhaust ports, contributing to accelerate the fluid discharge speed.

What is claimed is:

1. A balanced type direct-acting electromagnetic valve including a main valve assembly incorporating a slidable valve body to switch the flow direction of a pressurized fluid and an electromagnetic drive having a movable iron core for directly driving said valve body, characterized in that:

said main valve assembly comprises a casing internally defining a valve bore for receiving said valve body slidably therein, and having an inlet port opened into a center portion of said valve bore, a couple of output ports opened into said valve bore at positions axially on the opposite sides of said inlet port, a couple of exhaust ports opened into said valve bore at positions axially on the outer sides of said respective output ports, and a couple of chambers formed in association with the opposite ends of said valve bore; and said valve body comprises an axial through hole intercommunicating said two chambers, and a couple of guide rings fitted on circumferential surfaces of axially opposite end portions thereof and held in sliding contact with inner peripheral surfaces of said valve bore to guide movements of said valve body therealong, said guide rings being each formed with a gap space for communicating said two chambers with valve bore portions where said exhaust ports are opened, said valve body having equalized pressure receiving areas at the opposite ends thereof.

2. A balanced type direct-acting electromagnetic valve as defined in claim 1, wherein said movable iron core of said electromagnetic drive is positioned in one of said chambers at the opposite ends of said valve bore along with a return spring member for biasing said movable iron core toward an initial or returned position, and a valve spring is mounted in the other chamber for biasing said valve body toward said movable iron core.

\* \* \* \* \*